(12) United States Patent
Shen et al.

(10) Patent No.: US 11,892,541 B2
(45) Date of Patent: Feb. 6, 2024

(54) AIR-COUPLED ULTRASONIC INTERFEROMETRY METHOD

(71) Applicant: SUZHOU PHASERISE TECHNOLOGY CO., LTD., Suzhou (CN)

(72) Inventors: Yuping Shen, Suzhou (CN); Mingming Xie, Suzhou (CN); Xuxiang Zhu, Suzhou (CN); Xinzong Zhou, Suzhou (CN); Junhui Zhao, Suzhou (CN)

(73) Assignee: SUZHOU PHASERISE TECHNOLOGY CO., LTD., Suzhou (CN)

( * ) Notice: Subject to any disclaimer, the term of this patent is extended or adjusted under 35 U.S.C. 154(b) by 115 days.

(21) Appl. No.: 17/614,538

(22) PCT Filed: Nov. 20, 2019

(86) PCT No.: PCT/CN2019/119709
§ 371 (c)(1),
(2) Date: Nov. 28, 2021

(87) PCT Pub. No.: WO2020/248516
PCT Pub. Date: Dec. 17, 2020

(65) Prior Publication Data
US 2022/0229177 A1 Jul. 21, 2022

(30) Foreign Application Priority Data

Jun. 10, 2019 (CN) .......................... 201910494935.2

(51) Int. Cl.
*G01S 15/34* (2006.01)
*G01S 15/931* (2020.01)

(52) U.S. Cl.
CPC ............ *G01S 15/34* (2013.01); *G01S 15/931* (2013.01)

(58) Field of Classification Search
CPC ........ G01S 15/34; G01S 15/931; G01S 15/36; G01S 7/534; G01S 15/08; G01B 17/06
(Continued)

(56) References Cited

U.S. PATENT DOCUMENTS

2015/0136836 A1   5/2015   Suter et al.

FOREIGN PATENT DOCUMENTS

| CN | 102865839 A | 1/2013 |
| CN | 103676240 A | 3/2014 |

(Continued)

OTHER PUBLICATIONS

Dodson et al., "The science case for simultaneous mm-wavelength receivers in radio astronomy" New Astronomy Reviews 79 (2017) 85-102 (Sep. 19, 2017).

(Continued)

*Primary Examiner* — Daniel L Murphy
(74) *Attorney, Agent, or Firm* — SZDC Law PC

(57) ABSTRACT

An air-coupled ultrasonic interferometric method is disclosed. An air-coupled ultrasonic transducer, as a probe, is placed directly facing the surface of a workpiece, and an ultrasonic wave is reflected back and forth between the ultrasonic transducer and the surface of the workpiece; the phase difference of the first echo reflected from the surface of the workpiece and reaching the air-coupled ultrasonic transducer is measured; based on the change of the ultrasonic frequency and wavelength, the measured distance is transformed into the rate of change of the acoustic phase with respect to the acoustic angular frequency, wherein the change in the acoustic angular frequency is a product obtained by multiplying $2\pi$ by the difference between the highest frequency F2 and the lowest frequency F1 within the bandwidth fB of the air-coupled ultrasonic transducer.

8 Claims, 3 Drawing Sheets

(58) Field of Classification Search
USPC .......................................................... 367/125
See application file for complete search history.

(56) References Cited

FOREIGN PATENT DOCUMENTS

| | | |
|---|---|---|
| CN | 105004792 A | 10/2015 |
| CN | 108226304 A | 6/2018 |
| CN | 108445517 A | 8/2018 |
| CN | 109696680 A | 4/2019 |
| CN | 110231006 A | 9/2019 |
| EP | 2745107 A1 | 6/2014 |
| JP | S5871421 A | 4/1983 |
| JP | H10300551 A | 11/1998 |
| JP | 2012037294 A | 2/2012 |
| KR | 101851706 B1 | 4/2018 |
| SU | 1357708 A1 | 12/1987 |

OTHER PUBLICATIONS

Zhao et al. "Application of middle range ultrasonic guided wave by EMAT" NDT, vol. 27, No. 11, 2015 (Dec. 31, 2015), abstract only in English.

Liu, A phase spectrum method for determination of ultrasonic wave velocity, Acoustic technology, vol. 12, No. 2, pp. 19-22 (May 5, 1993), abstract only in English.

Chen et al., Radar-based displacement/distance measuring techniques, Journal of electronic measurement and instrumentation, vol. 29, No. 9, pp. 1251-1265 (Sep. 15, 2015), abstract only in English.

AIR-COUPLED ULTRASONIC INTERFEROMETRY METHOD

This application is the National Stage Application of PCT/CN2019/119709, filed on Nov. 20, 2019, which claims priority to Chinese Patent Application No. 201910494935.2, filed on Jun. 10, 2019, which is incorporated by reference for all purposes as if fully set forth herein.

FIELD OF THE INVENTION

The present invention relates to the technical field of air-coupled ultrasonic ranging, in particular to an air-coupled ultrasonic interferometric method.

BACKGROUND OF THE INVENTION

After performing high-precision nano-machining on a complex structure, it is necessary to make high-precision measurement of the free-form surface of the structure. However, the high-precision measurement method and technology of static free-form surfaces has always been a challenge. It is difficult to perform ultra-precision measurement of the surface profile accuracy after ultra-precision machining, and the measurement cost is high; and there is no applicable breakthrough in surface characterization theory and measurement methods.

In the current high-precision measurement methods used for the free-form surface of the nano-machined surface of the complex structure, a three-axis coordinate machine technology platform is generally used in the industry. This technology platform comprises a high-precision ruler system (e.g., a linear scale, a precision screw rod, an inductosyn, a grating ruler, a magnetic ruler and a light wavelength, etc.), a guideway system (e.g., a sliding guideway, a rolling bearing guideway and an air floating guideway, etc.), a technical module system (e.g., drive, balance and turntable, etc.), and a three-dimensional probe that is technically independent of other parts of the three-axis coordinate machine. Generally, the three-axis coordinate machine system with the accuracy of position and size measurement reaching the order of micron is already a high-end product, with the key depending on the technical level of the measurement accuracy of the probe. The probes are divided into contact probes and non-contact probes. The contact probes are the main type of probes currently used, having the measurement accuracy generally not superior to the order of micron.

The non-contact probes are mainly divided into optical, ultrasonic and electromagnetic probes. Among them, the optical probes are currently a research hotspot at home and abroad. The methods used by the optical probes are divided into a line structured light method, a laser triangulation method, a laser semi-focal spot imaging method and so on. The current best laboratory index in China found in the public literature is achieved by a semi-focal spot imaging laser probe, having the best effect of the uncertainty of repeated aiming reaching the order of micron, the measurement sensitivity reaching 30 mV/μm, and the inclination of the measured curved surface of laser tracking aiming reaching 25°. However, this method is greatly affected by the type of material, and the color of the material and the light absorption properties of the material surface will affect the sensitivity of the measurement. Therefore, different standard samples need to be used for different materials. Sometimes standard samples of materials are difficult to obtain.

The laser interferometric probe is mainly most sensitive to small relative changes, but not to absolute ones. The absolute measurement accuracy is limited by the three-dimensional coordinate aiming of the console. Moreover, the laser interferometric probe has very high requirements for the laser reflection characteristics of the surface of the measured workpiece, too high or too low reflectivity not suitable. In addition, for some special light-absorbing materials, lasers of different wavelengths are required. Therefore, the laser interferometric method has not been widely promoted and applied at present.

The air ultrasonic ranging is mainly carried out by the time difference method. Generally, the higher the frequency is, the higher the ranging accuracy will be. However, the high-frequency ultrasonic waves in the order of 1 MHz are so attenuated in the air that they cannot be used for common ranging. Besides, the air ultrasonic time difference method is greatly disturbed by the outside world, so the ranging accuracy of the time difference method in practical application is greatly reduced. For example, the air-coupled ultrasonic ranging reversing radar widely used in the automotive industry generally uses frequencies in the order of tens of KHz, and its ranging accuracy is usually in the order of one emission wavelength. For example, the ranging accuracy of a 40 KHz ultrasonic reversing radar is about 10 mm.

CONTENTS OF THE INVENTION

The present invention adopts the following technical solution: An air-coupled ultrasonic interferometric method is provided, wherein if an air-coupled ultrasonic probe is placed directly facing the surface of a workpiece, the ultrasonic waves emitted by an ultrasonic transducer will be reflected back and forth between the ultrasonic transducer and the surface of the workpiece. The wavelength λ of the ultrasonic wave propagating in the air is as follows:

$$\lambda = c/f \tag{1}$$

where c is the acoustic speed in the air, and f is the ultrasonic frequency.

If the frequency changes, the sound path of the air ultrasonic probe will remain unchanged, but the phase will change. The phase difference Φ of the first echo reflected from the surface of the workpiece and reaching the air-coupled ultrasonic transducer is as follows:

$$\Phi = 2\pi L/\lambda \tag{2}$$

where L is the sound path of the ultrasonic wave from the transducer to the surface of the workpiece and then reflected back to the transducer, and thus the distance between the air-coupled ultrasonic transducer and the workpiece is L/2. After substituting formula (1) into formula (2), the following formula is obtained:

$$\Phi = 2\pi L f/c \tag{3}$$

If the ultrasonic frequency changes slightly, the phase difference will also change slightly. Formula (3) is expanded for the slight frequency change Δf to obtain the slight phase difference change ΔΦ:

$$\Delta\Phi = 2\pi L \Delta f/c = L \Delta\omega/c \tag{4}$$

where Δω is the slight angular frequency change. After continuing to organize formula (4), the following formula is obtained:

$$L = c \bullet \Delta\Phi/\Delta\omega \tag{5}$$

It can be seen from formula (5) that the measured distance is converted into the rate of change of the phase with respect to the angular frequency ω, with the rate of change being a constant linearly related to the measured distance. If ΔΦ in formula (5) is taken as one period 2π, formula (5) will change into the following formula:

$$L=c/\Delta f=c/(f_2-f_1) \quad (6)$$

where $f_1$ and $f_2$ are the frequencies corresponding to two adjacent phase periods.

Preferably, formula (6) can also be derived by another method. If the total sound path at a certain frequency $f_1$ is an integer n multiple of the wavelength λ1, the following formula will be obtained:

$$L=n\lambda_1=nc/f_1 \quad (7)$$

If the frequency is continuously increased, a frequency $f_2$ can be obtained at which the total sound path is an integer (n+1) multiple of the wavelength $\lambda_2$:

$$L=(n+1)\lambda_2=(n+1)c/f_2 \quad (8)$$

Formula (6) can also be obtained by combining formulas (7) and (8) to eliminate n and solve for L.

The lowest frequency within the bandwidth fs of the air-coupled ultrasonic transducer is defined as $F_1$, at which the sound path L is an integer $N_1$ multiple of the wavelength; the highest frequency within the bandwidth $f_B$ of the air-coupled ultrasonic transducer is defined as $F_2$, at which the sound path L is an integer $N_2$ multiple of the wavelength. We will explain later that $N_1$ and $N_2$ can be accurately calculated by the acoustic time difference method or the interferometric method. We will also explain later that usually the difference between the bandwidth of the transducer and the difference between these two frequencies is very small, that is:

$$F_2-F_1 \approx f_B \quad (9)$$

For the convenience of expression, the frequency bandwidth $f_B$ will be used to replace the frequency difference in formula (9) to illustrate the physical meaning of the frequency difference. After substituting the frequency difference and phase difference into formula (5), the following formula is obtained:

$$L=c\bullet(N_2-N_1)/(F_2-F_1) \quad (10)$$

With c, $N_2$ and $N_1$ being easily determinable constants, the relative error of the total sound path in formula (10) can be known from the error analysis as follows:

$$\delta L/L=\delta(F_2-F_1)/|F_2-F_1|=(|\delta F_2|+|\delta F_1|)/|F_2-F_1| \quad (11)$$

Alternatively, the relative measurement error of the distance between the probe of the air-coupled ultrasonic transducer and the workpiece is as follows:

$$(\delta L/2)/(L/2)=(|\delta F_2|+|\delta F_1"|)/|F_2-F_1| \quad (12)$$

The absolute measurement error of the total sound path L is as follows:

$$\delta L=L\bullet(|\delta F_2|+|\delta F_1|)/|F_2-F_1| \quad (13)$$

Alternatively, the absolute measurement error of the distance between the probe of the air-coupled ultrasonic transducer and the workpiece is as follows:

$$\delta L/2=L/2\bullet(|\delta F_2|+|\delta F_1|)/|F_2-F_1|\approx L/2\bullet(|\delta F_2|+|\delta F_1|)/f_B \quad (14)$$

Formulas (12) and (14) provide us with calculation formulas for estimating the relative and absolute accuracies of the measurement. Formula (14) indicates that in order to improve the absolute accuracy of the measurement, it is necessary to increase the bandwidth $f_B$ (or $F_2-F_1$), reduce the measured distance L/2, and reduce the measurement uncertainty of $F_1$ and $F_2$. For the air-coupled ultrasonic transducer, since the reflectivity of the ultrasonic wave emitted by a single probe on the surface of the measured workpiece is nearly 100% and the signal is very strong, the range of the applied bandwidth can be appropriately widened in the application of air ultrasonic ranging, such as a bandwidth of −20 dB. Generally, the insertion loss of a commercial application-level piezoelectric air-coupled ultrasonic transducer in the air is about 20% to 50% for a bandwidth of −6 dB, and can reach 100% for a bandwidth of −20 dB. Therefore, the bandwidth fs in formula (14) can be approximately replaced by the center frequency $f_W$ of the transducer. Without loss of generality, formula (14) can be organized as follows:

$$\delta L/2 \approx L/2\bullet(|\delta F_2|+|\delta F_1|)/f_w \quad (15)$$

For example, if a very common 300 KHz air-coupled ultrasonic piezoelectric transducer is used, wherein the distance between the transducer and the workpiece is selected to be 45 mm, and the frequency step is selected to be 10 Hz (in other words, the measurement error of frequency is selected to be 10 Hz), the measurement error of distance will be as follows according to formula (15):

$$\delta L/2 \approx 45 \text{ mm}\bullet(10+10)/(300 \text{ k})=3\times 10^{-1} \text{ mm}=3\mu m \quad (16)$$

This measurement accuracy is much higher than that of the pulse reflection method.

Let's go back and demonstrate the rationality of formula (9). From the experimental parameters selected above, it can be known that the frequency difference of two adjacent periods is as follows:

$$(f_2-f_1)=c/L=340/(90\times 10^{-3})=3800 \text{ Hz}=3.8 \text{ KHz} \quad (17)$$

The percentage of the maximum difference between $f_B$ and $(F_2-F_1)$ in formula (9) is as follows:

$$2\times 3.8 \text{ KHz}/300 \text{ KHz}=2.5\% \quad (18)$$

Therefore, formula (9) is approximately true on a basis, and the bandwidth fs can be used to replace the frequency difference $F_2-F_1$ for explaining the physical meaning. This further indicates that the wider the bandwidth is, the more accurate the interferometric method will be.

The above interferometric measurement is carried out through a special ultrasonic excitation method. A sine wave or square wave varying between positive and negative values is used to continuously excite the air-coupled ultrasonic transducer at a fixed frequency, with the excitation time greater than the time of the first echo and less than the time of the second echo. The time of the first echo and the time of the second echo can be quickly obtained by a short-period pulse reflection method. Then the excitation frequency is changed, and the frequency sweep detection is carried out according to the above excitation method. A two-dimensional diagram is made with a sweeping angular frequency as the abscissa and the integral of the absolute value of a time-domain signal allowing interference to occur as the ordinate. Then the curve in the two-dimensional diagram is similar to a sine wave, and can be fitted by a regression algorithm using a sine wave function. The wider the frequency band is, the more accurate the fitting result will be. The period of the fitted sine wave function can be considered as Δω when ΔΦ is equal to 2π in claim 2. The range of the time-domain signal allowing interference to occur is the time interval from the time of the second echo to the ultrasonic continuous excitation time plus the time of the first echo.

The present invention has the following advantages:

1. Based on the continuous emission for a long time exceeding one echo time and the large-span frequency sweep within a relative bandwidth, this ultrasonic technology has the advantages of high measurement accuracy and strong anti-interference ability; however, its corresponding technology in laser interference is difficult to achieve.

2. With the theoretical relative ranging accuracy proportional to the ratio of the measurement error of frequency to the bandwidth of the air-coupled ultrasonic transducer, this technology enables its short-distance ranging accuracy to reach the order of submicron and its long-distance ranging accuracy to be superior to 1% of the wavelength.

3. This ranging technology can be used at a short distance for high-precision sweeping of free-form surface contours, and at a long distance for ultrasonic radar anti-interference ranging for cars in auto-driving.

BRIEF DESCRIPTION OF THE DRAWINGS

The present invention will be further described below with reference to drawings and examples.

DETAILED DESCRIPTION OF THE EMBODIMENTS

Figure 1:
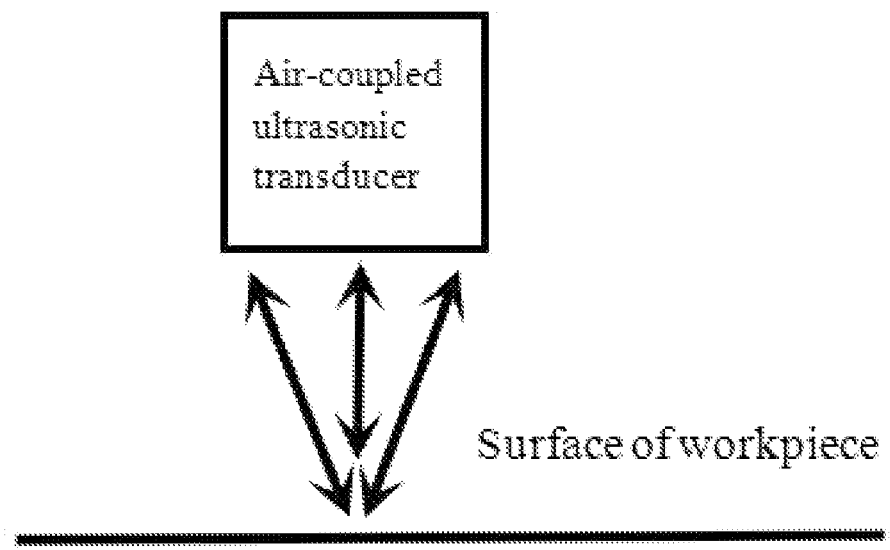
FIG. 1 is a schematic diagram of ranging of the air-coupled ultrasonic probe.
Figure 2:
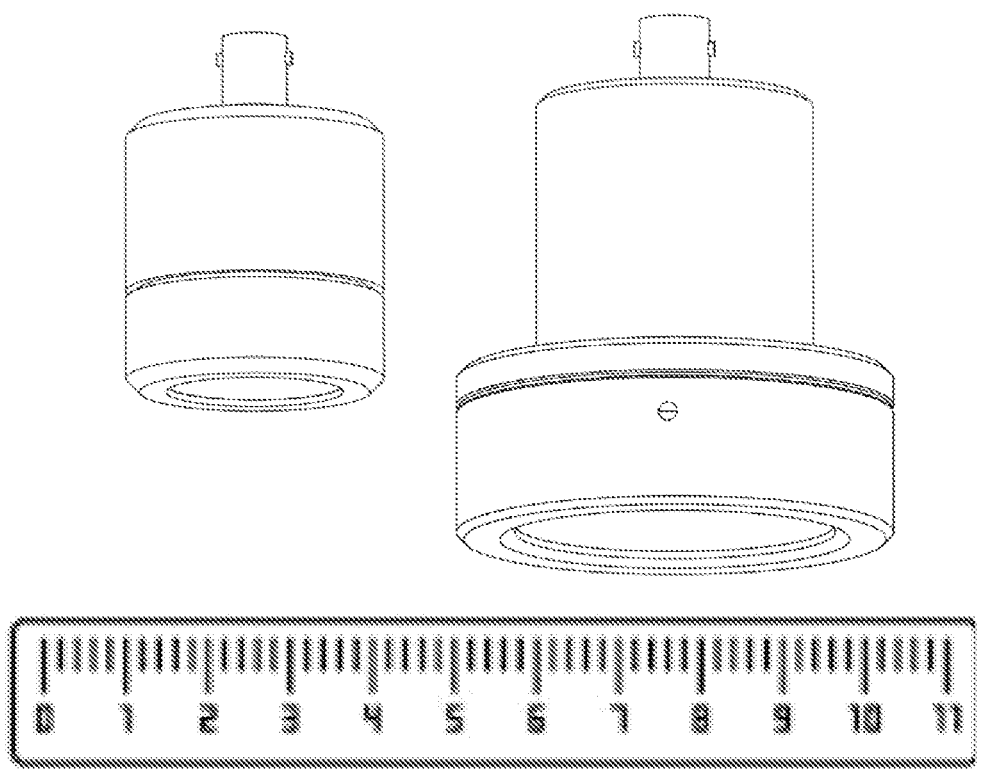
FIG. 2 is a physical image of the air-coupled ultrasonic probe.

Example:

An air-coupled ultrasonic transducer is placed vertically facing the free-form surface of a measured workpiece, as shown in FIG. 1. A focusing transducer can reduce the focal spot and improve the lateral resolution, and an air-coupled ultrasonic planar transducer with small diameter and high frequency can also achieve similar effects. The air-coupled ultrasonic transducer has its outer diameter generally in the range of 10-50 mm (as shown in the physical photo in FIG. 2), and it can be directly installed as a probe on a three-axis coordinate measuring machine through a suitable fixture. The focusing transducer has its focal spot generally in the range of 1-5 mm, and its focal length in the range of 5-50 mm; the planar transducer has its wafer diameter generally in the range of 10-50 mm, and its near-field area generally in the range of 10-100 mm. The air-coupled ultrasonic transducer generally uses the planar type in a high frequency band (above 1 MHz).

An air-coupled ultrasonic automatic sweeping system is selected as the test platform; a piezoelectric air-coupled ultrasonic transducer with the center frequency of 400 KHz is fixed vertically about 42 mm above the surface of the workpiece, and a piezoelectric air-coupled ultrasonic transducer with the center frequency of 550 KHz is fixed vertically about 25 mm above the surface of the workpiece.

Figure 3:
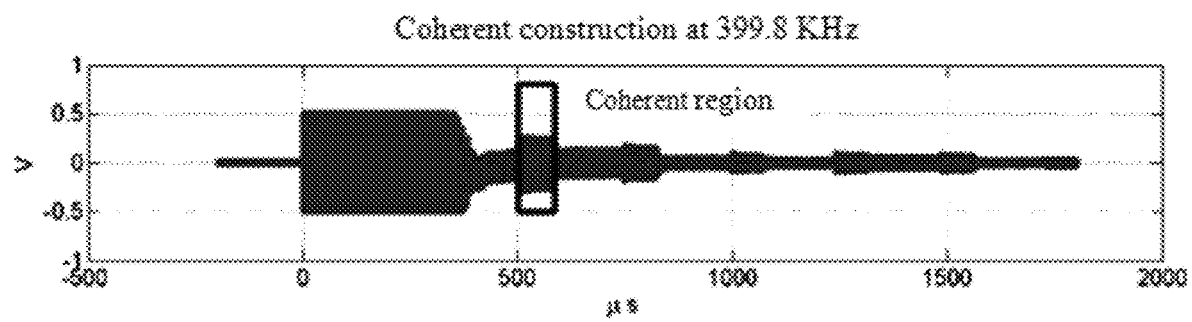
FIG. 3 shows the frequency of coherent construction generated by continuous excitation of 120 cycles at 399.8 KHz and 50 Vpp.
Figure 4:
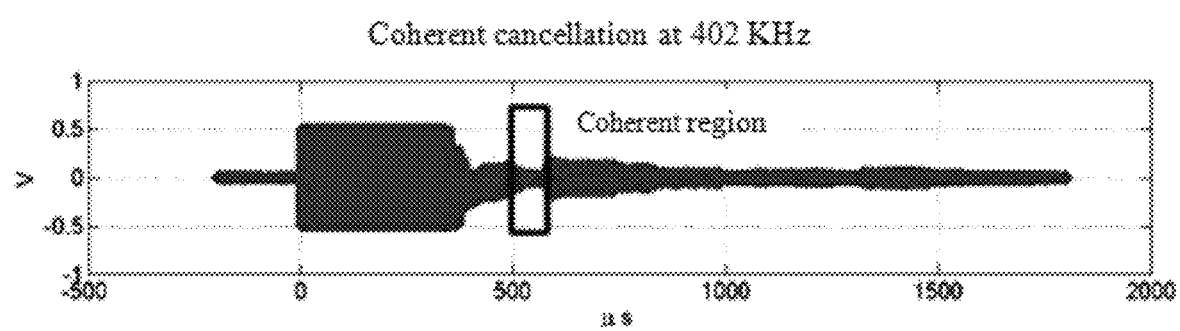
FIG. 4 shows the frequency of coherent cancellation generated by continuous excitation of 120 cycles at 402 KHz and 50 Vpp.
Figure 5:
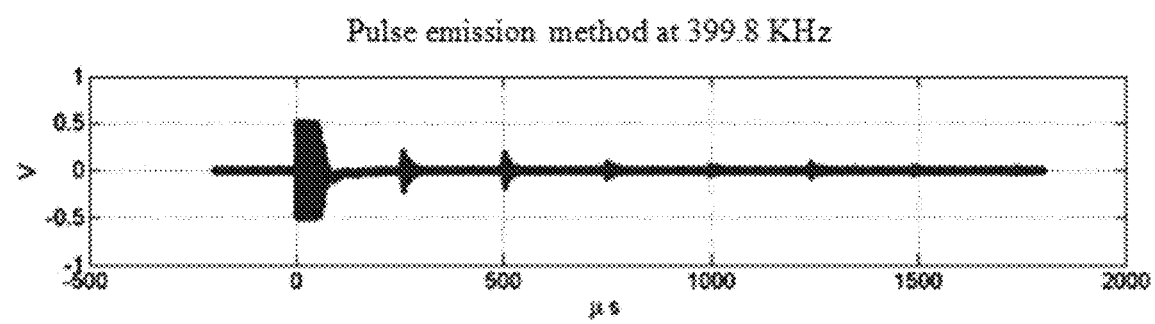
FIG. 5 shows the frequency for measurement by the time difference method generated by continuous excitation of 3 cycles at 399.8 KHz and 50 Vpp.
Figure 6:
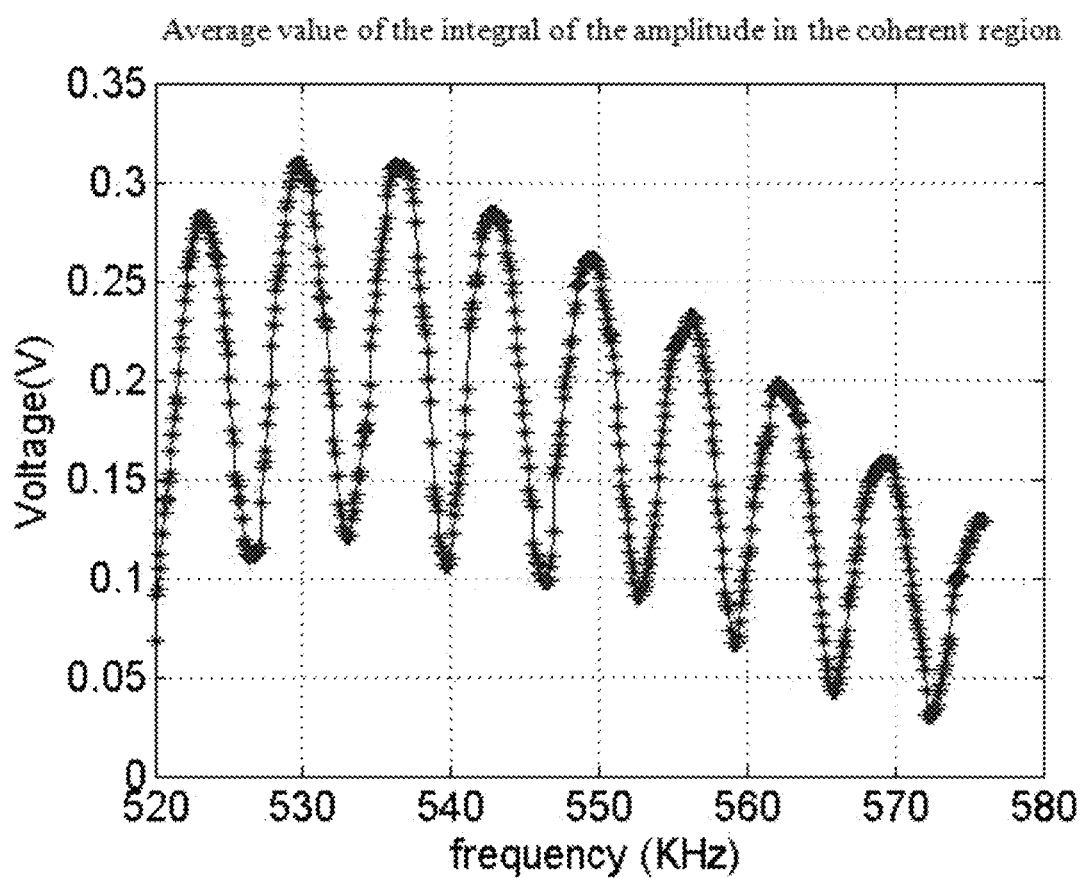
FIG. 6 shows the variation of the average value of the integral of the absolute value of the amplitude in the coherent region obtained when the 550 KHz transducer is located 25 mm above the workpiece with frequency.

The curves of the acoustic piezoelectric signal emitted and received by the 400 KHz transducer over time is shown in FIGS. 3-5. The data obtained from 3 cycles of excitation in FIG. 5 can be used for rough ranging by the time difference method, with the accuracy of multiple repeated measurements superior to 1 mm. FIGS. 3 and 4 are obtained from continuous wave excitation, wherein the time of continuous excitation is greater than the time of the first echo and less than the time of the second echo, and thus the portion of the continuous excitation exceeding the time of the first echo produces an interference effect with the first echo. Some frequencies are of coherent construction and some frequencies are of coherent cancellation, which are shown in the second echo (as marked by the box in the figures). By obtaining the average value of the integral of the absolute value of the amplitude in the coherent region, a curve that varies with frequency in a manner similar to a sine wave will be obtained. FIG. 6 shows the variation of the average value of the integral of the absolute value of the amplitude in the coherent region obtained when a transducer with a higher frequency of 550 KHz is placed about 25 mm above the workpiece with frequency. In practical application, the curve can be band-pass filtered once into a sine wave curve that is smoother and easier to process.

From FIG. 6 it can be estimated with the naked eye that the interference phase in the range of about 530-570 KHz has changed for 6 cycles. By substituting the data into formula (10), the following formula can be obtained:

$$L = c \cdot (N_2 - N_1)/(F_2 - F_1) = 340 \text{ m/s} \times \frac{6}{(570 - 530) \text{ KHz}} = 51 \text{ mm} \quad (19)$$

That is to say, the distance between the transducer and the measured point on the workpiece is (51/2) mm=25.5 mm, which is close to the approximate position of 25 mm where the transducer is placed during the experiment. Calculations with an accuracy of the order of micron can be achieved by extracting more accurate frequency data from FIG. 4. For example, by filtering the curve in FIG. 6 and then regression-fitting it with a sine wave function, an accurate fitted sine function period can be obtained. The period is multiplied by $2\pi$ to get $\Delta\omega$ when $\Delta\Phi$ is equal to $2\pi$ in formula (5), so the sound path L can be calculated by formula (5).

When the transducer reduces the frequency to the range of 40-100 KHz and works in a position 1-20 m from the workpiece, the author can quickly obtain an absolute error that is usually superior to the order of 1% of one wavelength in the actual experiment.

During frequency sweeping, in order to increase the ranging speed, the frequencies within the bandwidth except the two ends of the bandwidth can be used to quickly sample and sweep frequency according to the Nyquist's minimum sampling theorem, so as to determine $N_1$ and $N_2$ in formula (10). Before the coherent signal is obtained by the aforementioned continuous emission, the rough distance $L_C$ can be obtained by low-period pulse emission according to FIG. 3, and then the continuous maximum frequency sweeping step $F_S$ in the bandwidth can be obtained according to the following formula:

$$F_S > 2 \times \frac{c}{L_C} \quad (20)$$

In order to further increase the ranging speed, the frequency step sweep in the middle of the bandwidth can also be omitted. The period in FIG. 4 can be roughly estimated as $c/L_C$, from which the initial values of $N_1$ and $N_2$ in formula (11) can be obtained. In this way, finely sweeping in one period at a frequency at both ends of the bandwidth is sufficient to accurately determine $F_1$ and $F_2$ in formula (10).

In the high-precision air-coupled ultrasonic ranging interferometric technology proposed by the present invention, the relative accuracy of the measurement is equal to the ratio of the error of frequency measurement by electronic equipment to the specific applied frequency band of the air-coupled ultrasound. In practical engineering applications, the accuracy of frequency measurement is very high, and the relative frequency band of the air-coupled ultrasonic transducer used in the air is very high, so this technology can provide extremely high ranging accuracy. This technology enables its short-distance ranging accuracy to reach the order of submicron and its long-distance ranging accuracy to be superior to 1% of the wavelength. This ranging technology can be used at a short distance for high-precision sweeping of free-form surface contours, and at a long distance for ultrasonic radar anti-interference ranging for cars in auto-driving, etc.

The above examples only exemplarily illustrate the principles and effects of the present invention, but are not used to limit the present invention. Those skilled in the art can make modifications and variations on the above examples without departing from the spirit and scope of the present invention. Therefore, it is intended that the appended claims of the present invention cover all the equivalent modifications and variations made by those of ordinary skill in the art to the present invention without departing from the spirit and technical idea of the present invention.

The invention claimed is:

1. An air-coupled ultrasonic interferometric method, using an air-coupled ultrasonic transducer as a probe to directly face the surface of a workpiece, characterized in that: an ultrasonic wave is reflected back and forth between the ultrasonic transducer and the surface of the workpiece, and the phase difference of a first echo reflected from the surface of the workpiece and reaching the air-coupled ultrasonic transducer is measured; based on the change of the ultrasonic frequency and wavelength, the measured distance is transformed into the rate of change of the acoustic phase with respect to the acoustic angular frequency, wherein the change in the acoustic angular frequency is a product obtained by multiplying $2\pi$ by the bandwidth $f_B$ of the air-coupled ultrasonic transducer, and the change in the acoustic phase is a product obtained by multiplying $2\pi$ by the difference between the sound paths at the upper and lower boundary frequencies of the bandwidth respectively divided by the wavelength, wherein the relationship between the rate of change of the acoustic phase with respect to the acoustic angular frequency (i.e., the ratio of the acoustic phase difference to the acoustic angular frequency difference) and the sound path is as follows:

$L=\lambda\bullet(\Delta\Phi/2\pi)/\Delta f/f)=c\bullet\Delta\Phi/\Delta\omega$, where $\Delta\Phi$ is the acoustic phase difference, and $\Delta\omega$ is the acoustic angular frequency difference;

wherein the rate of change of the acoustic phase with respect to the acoustic angular frequency is a constant linearly related to the measured distance, and can also be transformed into the difference between the frequencies corresponding to two adjacent phase periods, having the relationship with the sound path as follows:

$L=c/\Delta f=c/(f_2-f_1)$; and wherein if the acoustic angular frequency difference and the acoustic phase difference are replaced by the relationship between the highest frequency $F_2$ (whose corresponding sound path is an integer multiple of the wavelength) and the lowest frequency $F_1$ (whose corresponding sound path is an integer multiple of the wavelength) within the bandwidth $f_B$ of the air-coupled ultrasonic transducer, the formula of the sound path will be converted as follows:

$L=c\bullet(N_2-N_1)/(F_2-F_1)$.

2. The air-coupled ultrasonic interferometric method according to claim 1, characterized in that: the ultrasonic continuous excitation time at a fixed frequency of detection is greater than the time of the first echo and less than the time of the second echo.

3. The air-coupled ultrasonic interferometric method according to claim 2, characterized in that: the ultrasonic wave is used for frequency sweep detection, then a two-dimensional diagram is made with a sweeping angular frequency as the abscissa and the integral of the absolute value of a time-domain signal allowing interference to occur as the ordinate, and then a sine wave change curve presented in the two-dimensional diagram is fitted with the sine wave function regression algorithm; the span of the frequency sweep is inversely related to the error of the fitting data; the period of the fitted sine wave function is the difference $2\eta(f_2-f_1)$ between the angular frequencies corresponding to two adjacent phase periods, and the acoustic phase difference $\Delta\Phi$ is $2\pi$ at this time.

4. The air-coupled ultrasonic interferometric method according to claim 3, characterized in that: the range of the time-domain signal allowing interference to occur is the time interval from the time of the second echo to the ultrasonic continuous excitation time plus the time of the first echo.

5. The air-coupled ultrasonic interferometric method according to claim 4, characterized in that: according to the error analysis method, the relative error formula of the sound path is $\delta L/L=\delta(F_2-F_1)/|F_2-F_1|=(|\delta F_2|+|\delta F_1|)/|F_2-F_1|$.

6. The air-coupled ultrasonic interferometric method according to claim 5, characterized in that: the absolute error formula of the sound path is $\delta L=L\bullet(|\delta F_2|+|\delta F_1|)/|F_2-F_1|$.

7. The air-coupled ultrasonic interferometric method according to claim 6, characterized in that: the phase difference of the first echo reflected from the surface of the workpiece and reaching the air-coupled ultrasonic transducer is $\Phi=2\eta L/\lambda$, where $\lambda$, is the wavelength, and L is the sound path of the ultrasonic wave emitted from the transducer to the surface of the workpiece and then reflected back to the transducer and is equal to twice the measured distance.

8. The air-coupled ultrasonic interferometric method according to claim 7, characterized in that: when the ultrasonic frequency changes, the wavelength and phase will change; the relationship between the difference between the phases before and after the change and the difference between the frequencies before and after the change is $$\Delta\Phi = \frac{2\pi L}{c}\Delta f.$$

* * * * *